(12) United States Patent
Komamine et al.

(10) Patent No.: US 11,889,231 B2
(45) Date of Patent: Jan. 30, 2024

(54) INFORMATION PROCESSING APPARATUS, NON-TRANSITORY COMPUTER READABLE MEDIUM, AND INFORMATION PROCESSING METHOD FOR PROCESSING IMAGES CAPTURED FROM VEHICLE

(71) Applicant: TOYOTA JIDOSHA KABUSHIKI KAISHA, Aichi-ken (JP)

(72) Inventors: Satoshi Komamine, Nagoya (JP); Toyokazu Nakashima, Nagoya (JP); Koichi Suzuki, Miyoshi (JP); Lei Wang, Toyota (JP); Jun Karashima, Toyota (JP); Kenichi Yamada, Nisshin (JP); Hiromitsu Fujii, Kariya (JP); Shota Minami, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/656,000

(22) Filed: Mar. 23, 2022

(65) Prior Publication Data

US 2022/0321843 A1 Oct. 6, 2022

(30) Foreign Application Priority Data

Mar. 31, 2021 (JP) ................................. 2021-061844

(51) Int. Cl.
*H04N 7/18* (2006.01)
*G01C 21/30* (2006.01)
*H04N 23/57* (2023.01)
*H04N 23/60* (2023.01)
*H04N 23/661* (2023.01)
(Continued)

(52) U.S. Cl.
CPC ............. *H04N 7/185* (2013.01); *G01C 21/30* (2013.01); *H04N 23/57* (2023.01); *H04N 23/64* (2023.01); *H04N 23/661* (2023.01); *H04N 1/32101* (2013.01); *H04N 2101/00* (2013.01); *H04N 2201/0084* (2013.01);
(Continued)

(58) Field of Classification Search
CPC ........ H04N 7/185; H04N 23/57; H04N 23/64; H04N 23/661; H04N 1/32101; H04N 2101/00; H04N 2201/0084; H04N 2201/3247; H04N 2201/3253; H04N 2201/3274; H04N 7/183; H04N 5/76; H04N 7/173; G01C 21/30; G01C 21/26; H04L 67/12
USPC ...................................... 348/231.3
See application file for complete search history.

(56) References Cited

U.S. PATENT DOCUMENTS

2010/0030872 A1* 2/2010 Caleca .................. G06F 3/1211
709/219
2011/0106428 A1* 5/2011 Park .................... G01C 21/3623
701/533
(Continued)

FOREIGN PATENT DOCUMENTS

| CN | 109564709 A | 4/2019 |
|---|---|---|
| CN | 110581981 A | 12/2019 |
| JP | H10304339 A | 11/1998 |

*Primary Examiner* — Usman A Khan
(74) *Attorney, Agent, or Firm* — HAUPTMAN HAM, LLP

(57) ABSTRACT

An information processing apparatus includes a controller that acquires images captured by a camera mounted in a vehicle, and a memory that can store the images. The controller acquires travel data on the vehicle for when the
(Continued)

image was captured and stores the image in the memory in a case in which the travel data satisfies a predetermined condition.

20 Claims, 4 Drawing Sheets

(51) Int. Cl.
    *H04N 101/00*      (2006.01)
    *H04N 1/32*      (2006.01)

(52) U.S. Cl.
    CPC ............ *H04N 2201/3247* (2013.01); *H04N 2201/3253* (2013.01); *H04N 2201/3274* (2013.01)

(56) References Cited

U.S. PATENT DOCUMENTS

| | | | |
|---|---|---|---|
| 2013/0155182 A1* | 6/2013 | Bekiares | H04N 23/66 348/36 |
| 2013/0188061 A1* | 7/2013 | Ellenby | H04N 23/64 348/207.1 |
| 2013/0198176 A1* | 8/2013 | Kim | G06F 16/58 707/758 |
| 2013/0307979 A1* | 11/2013 | Chen | G06V 20/54 348/148 |
| 2017/0208246 A1* | 7/2017 | Kimura | H04N 23/64 |
| 2019/0079108 A1* | 3/2019 | Takahashi | H04N 7/188 |
| 2019/0222797 A1 | 7/2019 | Teruuchi et al. | |
| 2019/0230325 A1* | 7/2019 | Yamada | G06V 20/62 |

\* cited by examiner

INFORMATION PROCESSING APPARATUS, NON-TRANSITORY COMPUTER READABLE MEDIUM, AND INFORMATION PROCESSING METHOD FOR PROCESSING IMAGES CAPTURED FROM VEHICLE

CROSS-REFERENCE TO RELATED APPLICATION

This application claims priority to Japanese Patent Application No. 2021-061844, filed on Mar. 31, 2021, the entire contents of which are incorporated herein by reference.

TECHNICAL FIELD

The present disclosure relates to an information processing apparatus, a program, and an information processing method.

BACKGROUND

Technology for collecting images, captured by a camera mounted in a vehicle, while the vehicle is in motion and using the images as images for tourism and other purposes is known. For example, see Patent Literature (PTL) 1.

CITATION LIST

Patent Literature

PTL 1: JP H10-304339 A

SUMMARY

The images captured by the camera mounted in the vehicle may not be suitable for the intended use, depending on the conditions when the vehicle is traveling. For example, the captured images might not be suitable for the intended use if the speed of the vehicle is too fast or too slow when the images are captured. As another example, the captured images might not be suitable for the intended use if the vehicle is not traveling on the desired route when the images are captured.

It would be helpful, in capturing images by a camera mounted in a vehicle, to enable the collection of images captured under conditions suitable for the intended use.

An information processing apparatus according to the present disclosure includes:

a controller configured to acquire an image captured by a camera mounted in a vehicle; and a memory configured to store the image, wherein the controller acquires travel data on the vehicle for when the image is captured, and stores the image in the memory in a case in which the travel data satisfies a predetermined condition.

A program according to the present disclosure causes a computer to perform operations including:

acquiring an image captured by a camera mounted in a vehicle;

acquiring travel data on the vehicle for when the image is captured; and storing the image in a case in which the travel data satisfies a predetermined condition.

An information processing method according to the present disclosure is an information processing method in an information processing apparatus and includes:

acquiring an image captured by a camera mounted in a vehicle;

acquiring travel data on the vehicle for when the image is captured; and storing the image in a case in which the travel data satisfies a predetermined condition.

According to the present disclosure, in capturing images by a camera mounted in a vehicle, images captured under conditions suitable for the intended use can be collected.

DETAILED DESCRIPTION

An embodiment of the present disclosure is described below with reference to the drawings.

Figure 1:
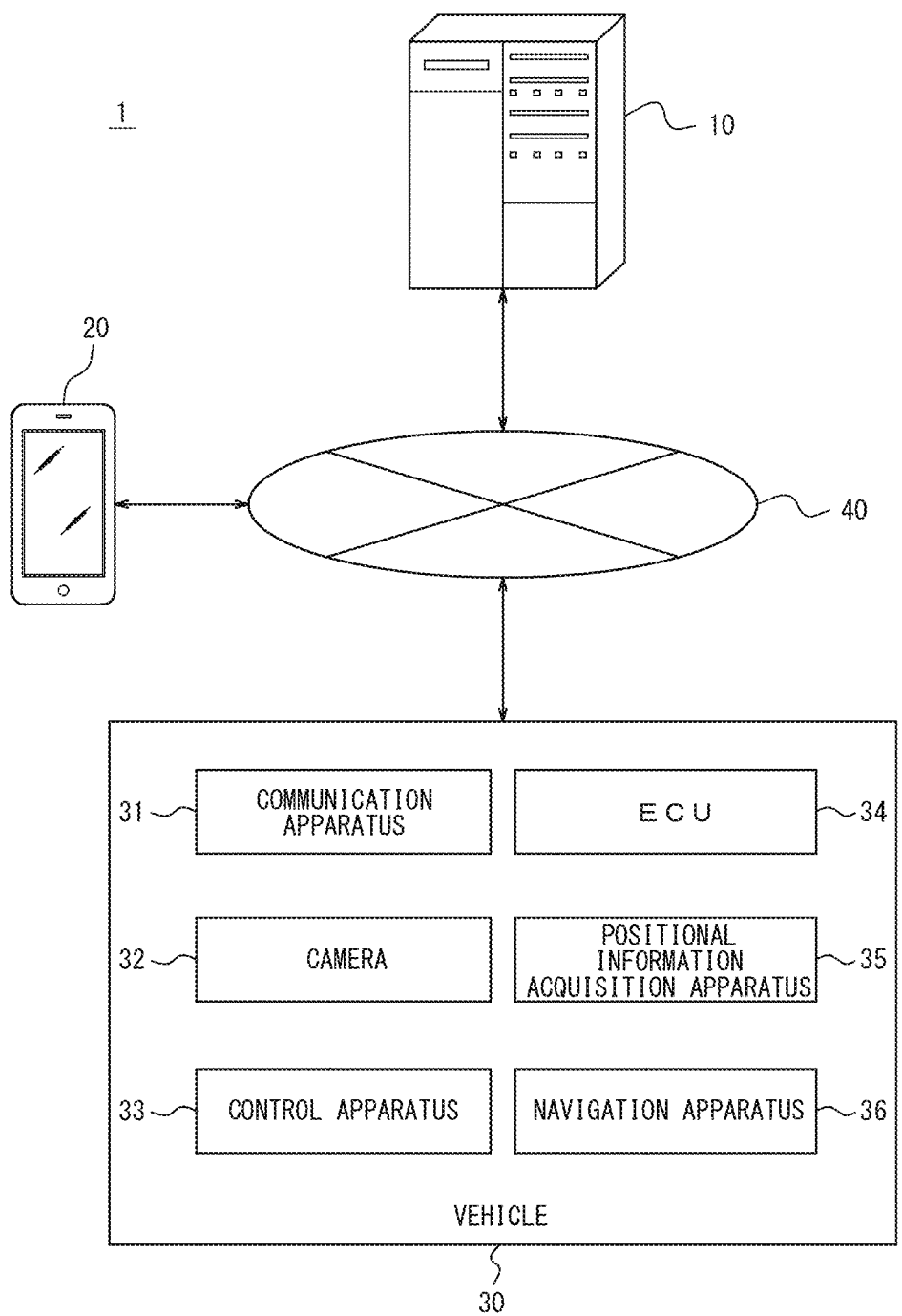
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes an information processing apparatus 10, a terminal apparatus 20, and a vehicle 30. The information processing apparatus 10, the terminal apparatus 20, and the vehicle 30 are communicably connected via a network 40. The network 40 may be a network including a mobile communication network, the Internet, and the like.

In FIG. 1, one each of the information processing apparatus 10, the terminal apparatus 20, and the vehicle 30 are illustrated, but the number of information processing apparatuses 10, terminal apparatuses 20, and vehicles 30 may be two or more of each.

The terminal apparatus 20 is a terminal apparatus owned by a user of the vehicle 30. The user is a user who has consented to transmitting and providing the images captured by a camera 32 mounted in the vehicle 30 to the information processing apparatus 10. The user has registered, in advance, with the information processing apparatus 10 that the user consents to transmitting the images captured by the camera 32 mounted in the vehicle 30 to the information processing apparatus 10.

The vehicle 30 may be, for example, a private car of the user. The vehicle 30 may be any type of automobile, such as a gasoline-powered vehicle, a diesel-powered vehicle, an HEV (Hybrid Electric Vehicle), a PHEV (Plug-in Hybrid Electric Vehicle), a BEV (Battery Electric Vehicle), an FCEV (Fuel Cell Electric Vehicle), or the like. Driving of the vehicle 30 may be automated at any level. The automation level is, for example, any one of Level 1 to Level 5 according to the level classification defined by the Society of Automotive Engineers (SAE).

The information processing apparatus 10 acquires images captured by the camera 32 mounted in the vehicle 30. At this time, the information processing apparatus 10 acquires, together with an image captured by the camera 32, travel data on the vehicle 30 when the image was captured. The travel data may include speed data on the vehicle 30, data on the route traveled by the vehicle 30, and the like.

The information processing apparatus 10 stores the image captured by the camera 32 mounted in the vehicle 30 in a case in which the travel data on the vehicle 30 for when the image was captured satisfies a predetermined condition.

The information processing apparatus 10 may, for example, be installed in a local government office, such as city hall or a prefectural office. Alternatively, the information processing apparatus 10 may be installed in a tourism-related business, such as a travel agency.

For example, the information processing apparatus 10 acquires from the vehicle 30 images, of a tourist attraction, captured by the camera 32 of the vehicle 30 when the vehicle 30 travels by the tourist attraction, and stores the images in the information processing apparatus 10. The information processing apparatus 10 may publish the stored images of the tourist attraction on the website of the local government or the like so that the general public may view the images. This allows people who access the website and view the images to see what the tourist attraction is like.

The information processing apparatus 10 may store only the images captured while the vehicle 30 is traveling while a predetermined condition is satisfied. This enables storage of only those images that are suitable for the intended use, i.e. being able to see what a tourist attraction is like. The predetermined condition may be that the speed of the vehicle 30 is in a predetermined range, that the vehicle 30 is traveling on a predetermined route, or the like. By storing images captured when the speed of the vehicle 30 is in a predetermined range, the information processing apparatus 10 can store images captured at a speed that is just right, i.e. neither too fast nor too slow. By storing images captured when the vehicle 30 travels a predetermined route, the information processing apparatus 10 can store images including images of tourist attractions to be introduced.

The information processing apparatus 10 can communicate with the terminal apparatus 20 and the vehicle 30 via the network 40. The information processing apparatus 10 is, for example, a dedicated computer configured to function as a server. The information processing apparatus 10 may be a general purpose personal computer (PC).

The terminal apparatus 20 can communicate with the information processing apparatus 10 via the network 40. The terminal apparatus 20 may, for example, be a smartphone or a tablet.

The vehicle 30 can communicate with the information processing apparatus 10 via the network 40.

Figure 2:
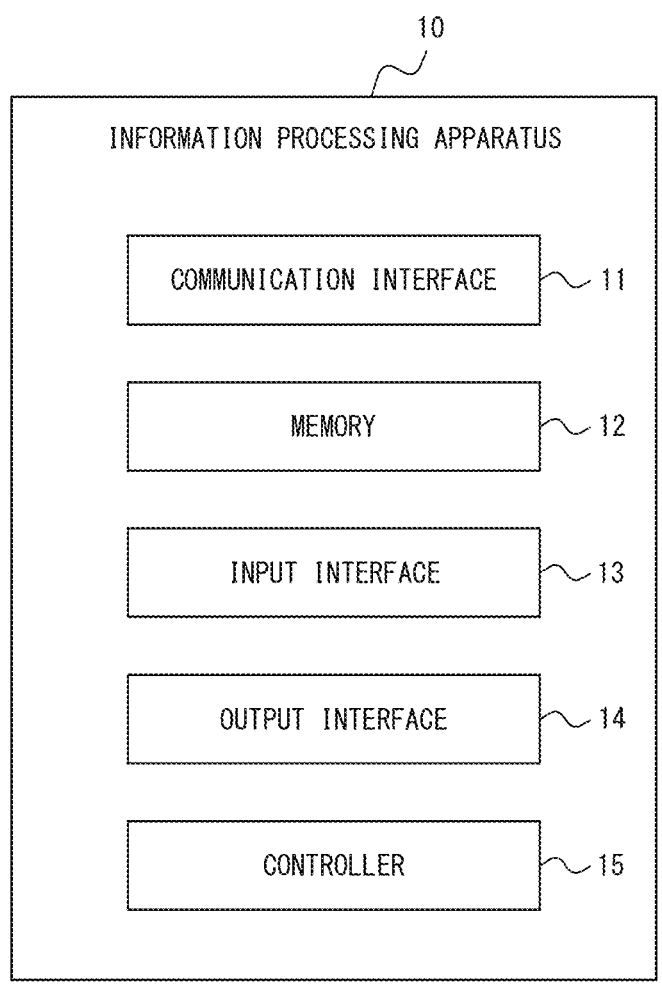
FIG. 2 is a block diagram illustrating a configuration of an information processing apparatus according to an embodiment of the present disclosure.

A configuration of the information processing apparatus 10 according to an embodiment of the present disclosure is described with reference to FIG. 2.

The information processing apparatus 10 includes a communication interface 11, a memory 12, an input interface 13, an output interface 14, and a controller 15.

The communication interface 11 includes a communication module connected to the network 40. For example, the communication interface 11 may include a communication module corresponding to a local area network (LAN). In an embodiment, the information processing apparatus 10 is connected to the network 40 via the communication interface 11. The communication interface 11 transmits and receives various information via the network 40. The communication interface 11 can communicate with the terminal apparatus 20 and the vehicle 30 via the network 40.

The memory 12 is, for example, a semi-conductor memory, a magnetic memory, an optical memory, or the like, but is not limited to these. The memory 12 may function as, for example, a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may be updated with information received from the network 40 via the communication interface 11, for example. A portion of the memory 12 may be installed externally to the information processing apparatus 10. In this case, the externally installed portion of the memory 12 may be connected to the information processing apparatus 10 via any appropriate interface.

The input interface 13 includes one or more input interfaces for detecting user input and acquiring input information based on user operation. For example, the input interface 13 includes, but is not limited to, a physical key, a capacitive key, a touch screen integrally provided with a display of the output interface 14, or a microphone that receives audio input.

The output interface 14 includes one or more output interfaces for outputting information to notify the user. For example, the output interface 14 includes, but is not limited to, a display for outputting information as images, a speaker for outputting information as audio, or the like.

The controller 15 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 15 executes processes related to operations of the information processing apparatus 10 while controlling components of the information processing apparatus 10.

Figure 3:
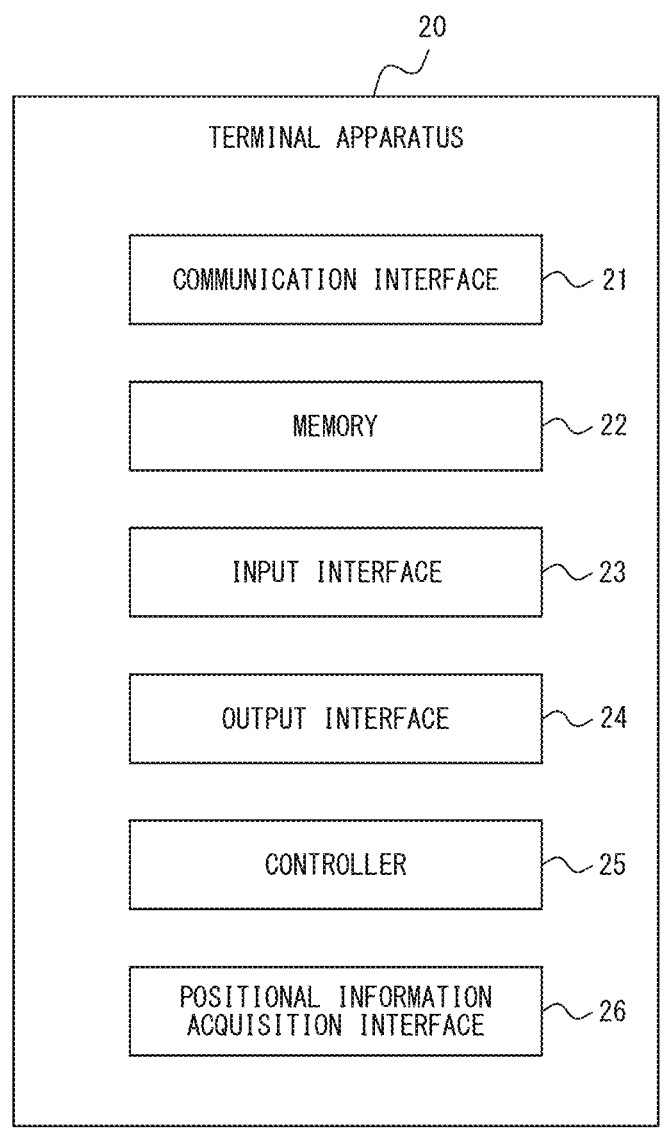
FIG. 3 is a block diagram illustrating a configuration of a terminal apparatus according to an embodiment of the present disclosure.

A configuration of the terminal apparatus 20 according to an embodiment of the present disclosure is described with reference to FIG. 3.

The terminal apparatus 20 includes a communication interface 21, a memory 22, an input interface 23, an output interface 24, a controller 25, and a positional information acquisition interface 26.

The communication interface 21 includes a communication module connected to the network 40. For example, the communication interface 21 may include a communication module compliant with mobile communication standards such as Long Term Evolution (LTE), 4th Generation (4G), and 5th Generation (5G). In an embodiment, the terminal apparatus 20 is connected to the network 40 via the communication interface 21. The communication interface 21 transmits and receives various information via the network 40. The communication interface 21 can communicate with the information processing apparatus 10 via the network 40.

The memory 22 is, for example, a semi-conductor memory, a magnetic memory, an optical memory, or the like, but is not limited to these. The memory 22 may function as, for example, a main memory, an auxiliary memory, or a cache memory. The memory 22 stores any information used for operations of the terminal apparatus 20. For example, the memory 22 may store a system program, an application program, various types of information received by the communication interface 21, and the like. The information stored in the memory 22 may be updated with information received from the network 40 via the communication interface 21, for example. A portion of the memory 22 may be installed externally to the terminal apparatus 20. In this case, the externally installed portion of the memory 22 may be connected to the terminal apparatus 20 via any appropriate interface.

The input interface 23 includes one or more input interfaces for detecting user input and acquiring input information based on user operation. The input interface 23 is, for example, a physical key, a capacitive key, a touch screen integrally provided with a display of the output interface 24, a microphone for receiving audio input, or the like, but is not limited to these.

The output interface 24 includes one or more output interfaces for outputting information to notify the user. For example, the output interface 24 includes, but is not limited to, a display for outputting information as images or a speaker for outputting information as audio.

The controller 25 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 25 executes processing related to operations of the terminal apparatus 20 while controlling each component of the terminal apparatus 20.

The positional information acquisition interface 26 includes at least one receiver compliant with a satellite positioning system. For example, the positional information acquisition interface 26 may include a Global Positioning System (GPS) receiver. The positional information acquisition interface 26 acquires a measured value of the position of the terminal apparatus 20 as positional information. The positional information includes, for example, an address, a latitude, a longitude, an altitude, and the like.

A configuration of the vehicle 30 according to an embodiment of the present disclosure is described with reference to FIG. 1.

The vehicle 30 includes a communication apparatus 31, a camera 32, a control apparatus 33, an electronic control unit (ECU) 34, a positional information acquisition apparatus 35, and a navigation apparatus 36. The communication apparatus 31, the camera 32, the control apparatus 33, the ECU 34, the positional information acquisition apparatus 35, and the navigation apparatus 36 are communicably connected via an in-vehicle network, such as Controller Area Network (CAN), or dedicated lines, for example.

The communication apparatus 31 includes a communication module that connects to the network 40. For example, the communication apparatus 31 may include a communication module compliant with a mobile communication standard such as LTE, 4G, and 5G. The vehicle 30 is connected to the network 40 via the communication apparatus 31. The communication apparatus 31 transmits and receives various information via the network 40. The communication apparatus 31 can communicate with the information processing apparatus 10 via the network 40.

The camera 32 is mounted in the vehicle 30. The camera 32 can capture images in front of, behind, and/or to the sides of the vehicle 30 while the vehicle 30 is in motion. Although only one camera 32 is illustrated in FIG. 1, a plurality of cameras 32 may be mounted in the vehicle 30.

The control apparatus 33 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The control apparatus 33 executes processing related to operations of the vehicle 30 while controlling each component of the vehicle 30.

The ECU 34 collects various types of vehicle data relating to the vehicle 30 from various sensors mounted in the vehicle 30. The ECU 34 outputs the collected vehicle data to the control apparatus 33. The vehicle data collected by the ECU 34 includes, for example, speed data, acceleration data, position data, headlight status, autonomous driving status, data regarding the road on which the vehicle 30 is traveling, and the like. Although one ECU 34 is illustrated in FIG. 1, a plurality of ECUs 34 may be mounted in the vehicle 30.

The positional information acquisition apparatus 35 includes one or more receivers compliant with any appropriate satellite positioning system. For example, the positional information acquisition apparatus 35 may include a GPS receiver. The positional information acquisition apparatus 35 acquires the measured position of the vehicle 30 as positional information. The positional information includes, for example, an address, a latitude, a longitude, an altitude, and the like.

The navigation apparatus 36 is mounted in the vehicle 30. The navigation apparatus 36 provides route guidance to the user of the vehicle 30 upon the destination being set. More specifically, the navigation apparatus 36 searches for a route to the destination and provides route guidance to the user based on the information on the current position of the vehicle 30 and the set destination.

The navigation apparatus 36 can communicate with the information processing apparatus 10. Upon the destination being set, the navigation apparatus 36 transmits information on the retrieved route that the vehicle 30 is to travel to the information processing apparatus 10.

(Operations of Information Processing System)

Operations of the information processing system 1 illustrated in FIG. 1 are described with reference to FIGS. 1 to 3.

A user who can transmit and provide the images captured by the camera 32 mounted in the vehicle 30 to the information processing apparatus 10 has registered in advance, with the information processing apparatus 10, that the images captured by the camera 32 mounted in the vehicle 30 can be transmitted to the information processing apparatus 10.

When registering in advance, with the information processing apparatus 10, that the images captured by the camera 32 can be transmitted to the information processing apparatus 10, the user inputs information indicating that the images can be transmitted to the input interface 23 of the terminal apparatus 20. The controller 25 transmits information, via the communication interface 21, indicating that the images can be transmitted to the information processing apparatus 10.

The communication interface 11 of the information processing apparatus 10 receives the information transmitted by the terminal apparatus 20 indicating that images can be transmitted. The controller 15 acquires, via the communication interface 11, the information transmitted by the terminal apparatus 20 indicating that images can be transmitted. The information processing apparatus 10 can thereby register information on a user who can provide images.

The number of users who have registered with the information processing apparatus 10 that the images captured by the camera 32 mounted in the vehicle 30 can be transmitted to the information processing apparatus 10 may be any number, one or more. In the case of a plurality of users, the memory 12 of the information processing apparatus 10 stores information on each of the users.

The information processing apparatus 10 stores a list, in the memory 12, of images that need to be collected. The list of images that need to be collected may, for example, be a list of images that a local government intends to publish to introduce a tourist attraction.

Each image included in the list of images that need to be collected is stored in the memory 12 in association with one or more predetermined conditions. The predetermined conditions are conditions that the vehicle 30 should meet when the camera 32 of the vehicle 30 captures the corresponding image. The predetermined conditions may, for example, include a condition to be met by the speed of the vehicle 30 when the image is captured. The predetermined conditions may, for example, include a condition on the route that the vehicle 30 is to travel when the image is captured.

When the list of images that need to be collected and the predetermined conditions are inputted through the input interface 13 by a local government employee or the like, the controller 15 stores the list of images that need to be collected and the predetermined conditions in the memory 12. Alternatively, the information processing apparatus 10 may use the communication interface 11 to receive the list of images that need to be collected and the predetermined conditions from another apparatus via the network 40. In this case, the controller 15 stores the list of images that need to be collected and the predetermined conditions received by the communication interface 11 in the memory 12.

A navigation apparatus 36 mounted in the vehicle 30 provides route guidance to the user of the vehicle 30 upon the destination being set. When the destination is set, the navigation apparatus 36 transmits, to the information processing apparatus 10, information on the route to be traveled by the vehicle 30.

The controller 15 of the information processing apparatus 10 acquires the information on the route to be traveled by the vehicle 30 from the navigation apparatus 36 via the communication interface 21. The controller 15 determines whether the acquired route to be traveled by the vehicle 30 passes near a route that enables capturing of any of the images included in the list, stored in the memory 12, of images that need to be collected. When the controller 15 determines that the acquired route passes near a route that enables capturing of any of the images included in the list of images that need to be collected, the controller 15 transmits, via the communication interface 11 to the terminal apparatus 20 of the user of the vehicle 30, information requesting capturing of the image that needs to be collected.

The information, transmitted by the controller 15, requesting capturing of the image that needs to be collected includes the predetermined conditions stored in the memory 12 in association with the image that needs to be collected. The information requesting capturing of the image that needs to be collected may include information such as an incentive to be granted to the user in the case in which the requested image can be acquired.

The communication interface 21 of the terminal apparatus 20 receives the information, transmitted by the information processing apparatus 10, requesting capturing of the image that needs to be collected. The controller 25 acquires, via the communication interface 21, information transmitted by the information processing apparatus 10 requesting capturing of the image that needs to be collected. The controller 15 outputs, through the output interface 24, the information requesting capturing of the image that needs to be collected. The user can thereby confirm the information requesting capturing of the image that needs to be collected.

The user confirms the predetermined conditions, incentive, and other such information included in the information requesting capturing of the image that needs to be collected and determines whether to accept the request to capture the image.

In the case of accepting the request to capture an image, the user drives the vehicle 30 in accordance with the predetermined conditions included in the information requesting capturing of the image. The control apparatus 33 of the vehicle 30 transmits the image, captured by the camera 32 while the vehicle 30 is traveling, to the information processing apparatus 10 via the communication apparatus 31.

The control apparatus 33 of the vehicle 30 continuously acquires the travel data on the vehicle 30 from the ECU 34 and the positional information acquisition apparatus 35. When transmitting, to the information processing apparatus 10, the image captured by the camera 32 while the vehicle 30 is traveling, the control apparatus 33 also transmits the travel data for when the camera 32 captured the image to the information processing apparatus 10 via the communication apparatus 31. The travel data may include speed data on the vehicle 30 for when the image was captured, data on the route traveled by the vehicle 30 when the image was captured, and the like. The control apparatus 33 can acquire the speed data on the vehicle 30 from the ECU 34. The control apparatus 33 can acquire the data on the route traveled by the vehicle 30 from the positional information acquisition apparatus 35.

The communication interface 11 of the information processing apparatus 10 receives, from the vehicle 30, the image captured by the camera 32 mounted in the vehicle 30 and the travel data on the vehicle 30 for when the image was captured. The controller 15 acquires, via the communication interface 11, the image captured by the camera 32 mounted in the vehicle 30 and the travel data on the vehicle 30 for when the image was captured.

The controller 15 compares predetermined conditions, stored in the memory 12 as the conditions for capturing the image acquired from the vehicle 30, with the travel data on the vehicle 30 acquired with the image. The controller 15 stores the acquired image in the memory 12 in a case in which the travel data satisfies the predetermined conditions. The controller 15 does not store the acquired image in the memory 12 in a case in which the travel data does not satisfy the predetermined conditions.

This enables the controller 15 to store, in the memory 12, only images captured under conditions suitable for the intended use. For example, when a speed range of the vehicle 30 and a route to be traversed by the vehicle 30 are set as the predetermined conditions, the controller 15 stores an image in the memory 12 when the image is captured by a vehicle 30 traveling in the predetermined speed range and on the predetermined route.

When storing the images acquired from the vehicle 30 in the memory 12, the controller 15 transmits the incentive to the terminal apparatus 20 of the user of the vehicle 30 via the communication interface 11. The incentive may, for example, be a coupon that can be used to purchase a product. By transmitting the incentive in this manner, the information processing apparatus 10 can increase the motivation for the user of the vehicle 30 to transmit images captured by the camera 32 of the vehicle 30 to the information processing apparatus 10.

Figure 4:
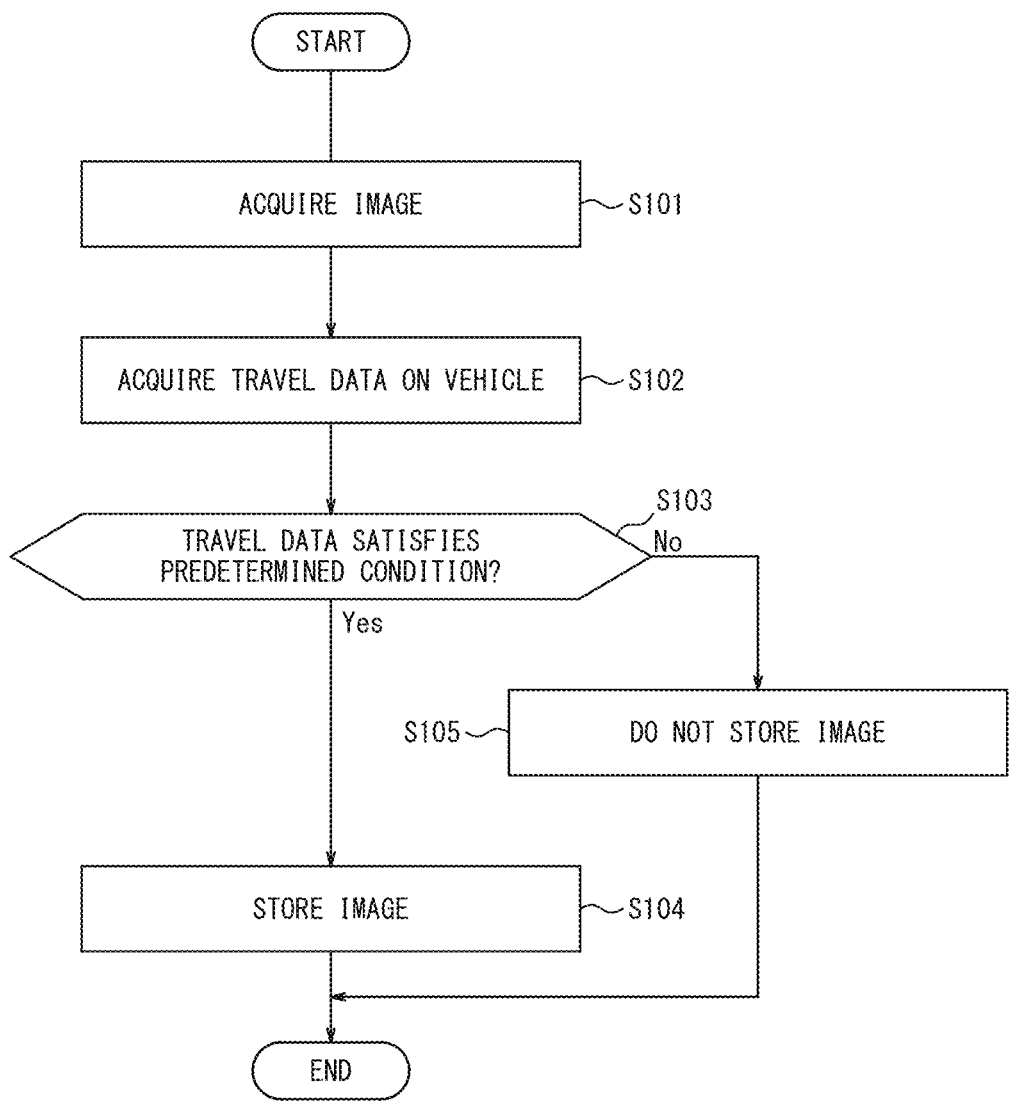
FIG. 4 is a flowchart illustrating operations of an information processing system according to an embodiment of the present disclosure.

Operations of the information processing system 1 are described with reference to the flowchart in FIG. 4.

In step S101, the controller 15 of the information processing apparatus 10 acquires an image captured by the camera 32 mounted in the vehicle 30.

In step S102, the controller 15 acquires travel data on the vehicle 30 for when the image acquired in step S101 was captured. Steps S101 and S102 may be performed simultaneously.

In step S103, the controller 15 determines whether the travel data acquired in step S102 satisfies the predetermined conditions stored in the memory 12 as conditions for capturing the image acquired in step S101.

In a case in which it is determined that the predetermined conditions are satisfied (step S103: Yes), the controller 15 proceeds to step S104 and stores the image acquired in step S101 in the memory 12.

When it is determined that the predetermined conditions are not satisfied (step S103: No), the controller 15 proceeds to step S105 and does not store the image acquired in step S101 in the memory 12.

As described above, in the information processing apparatus 10 according to the present embodiment, the controller 15 acquires an image captured by the camera 32 mounted in the vehicle 30 and travel data on the vehicle 30 for when the image was captured. The controller 15 stores the image acquired from the vehicle 30 in the memory 12 in a case in which the travel data satisfies the predetermined conditions. This enables the information processing apparatus 10 to store, in the memory 12, only images captured when the travel data satisfies predetermined conditions. Therefore, the information processing apparatus 10 according to the present embodiment can collect images captured under conditions suitable for the intended use as images captured by the camera 32 mounted in the vehicle 30.

The present disclosure is not limited to the embodiment described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some of the some processing operations executed in the information processing apparatus 10 in the above embodiment may be executed in the terminal apparatus 20 or the vehicle 30. Also, some of the processing operations executed in the terminal apparatus 20 in the above embodiment may be executed in the information processing apparatus 10. Some of the processing operations executed in the vehicle 30 in the above embodiment may be executed in the information processing apparatus 10.

For example, a configuration that causes a general purpose electronic device such as a smartphone, a computer, or the like to function as the information processing apparatus 10 according to the above embodiment is possible. Specifically, a program in which processes for realizing the functions of the information processing apparatus 10 or the like according to the embodiment are written may be stored in a memory of the electronic device, and the program may be read and executed by a processor of the electronic device. Accordingly, the present disclosure can also be embodied as a program executable by a processor.

For example, in the above embodiment, the case of the images captured by the vehicle 30 being images captured when driving by a tourist attraction is described as an example. The images captured by the vehicle 30 are not, however, limited to this example. The images captured by the vehicle 30 may be images other than those captured when driving by a tourist attraction.

For example, in the above embodiment, the travel data at the time the camera 32 captures an image has been described as being transmitted by the vehicle 30 to the information processing apparatus 10, but the travel data may be transmitted to the information processing apparatus 10 by the navigation apparatus 36 mounted in the vehicle 30. The navigation apparatus 36 can independently acquire speed data on the vehicle 30 and data on the route traveled by the vehicle 30.

The invention claimed is:

1. An information processing apparatus comprising:
a controller configured to acquire an image captured by a camera mounted in a vehicle; and
a memory configured to store the image, wherein
the controller is configured to acquire travel data on the vehicle when the image is captured, and cause the memory to store the image in a case in which the travel data satisfies a predetermined condition,
the memory includes a list of images that need to be collected, each image being associated with the predetermined condition,
the list of images that need to be collected is a list of images to be published by a local government to introduce a tourist attraction, and
the controller is configured to,
acquire information on a first route to be traveled by the vehicle, and
in response to determining the first route passing a second route that is different from the first route and enables capturing of one of the images included in the list of images, transmit information requesting capturing of the one of the images to a terminal apparatus of a user inside the vehicle, the terminal apparatus being separate from the camera mounted in the vehicle and configured to communicate with the vehicle via a network.

2. The information processing apparatus of claim 1, wherein the travel data includes speed data on the vehicle.

3. The information processing apparatus of claim 1, wherein the travel data includes data on a route traveled by the vehicle.

4. The information processing apparatus of claim 1, wherein the information requesting capturing of the one of the images includes the predetermined condition associated with the one of the images.

5. The information processing apparatus of claim 1, wherein the controller, upon storing the image captured by the vehicle in the memory, is configured to transmit an incentive to the terminal apparatus of the user inside the vehicle that captured the image stored in the memory.

6. The information processing apparatus of claim 1, wherein the controller and the memory of the information processing apparatus are not mounted in the vehicle.

7. The information processing apparatus of claim 4, wherein the controller and the memory of the information processing apparatus are not mounted in the vehicle.

8. The information processing apparatus of claim 1, wherein
the controller is configured to, in response to a destination being set on a navigation apparatus mounted in the vehicle, receive the information on the first route from the navigation apparatus, the information on the first route being related to the set destination and a current position of the vehicle.

9. The information processing apparatus of claim 6, wherein
the controller is configured to, in response to a destination being set on a navigation apparatus mounted in the vehicle, receive the information on the first route from the navigation apparatus, the information on the first route being related to the set destination and a current position of the vehicle.

10. A non-transitory computer readable medium storing a program configured to cause a computer to perform operations comprising:
acquiring an image captured by a camera mounted in a vehicle;
acquiring travel data on the vehicle when the image is captured; and
storing the image in a case in which the travel data satisfies a predetermined condition,
wherein
the program is configured to cause the computer to perform the operations further comprising: storing a list of images that need to be collected, each image being associated with the predetermined condition,
the list of images that need to be collected is a list of images to be published by a local government to introduce a tourist attraction, and
the program is configured to cause the computer to perform the operations further comprising:
acquiring information on a first route to be traveled by the vehicle, and
in response to determining the first route passing a second route that is different from the first route and enables capturing of one of the images included in the list of images, transmitting information requesting capturing of the one of the images to a terminal apparatus of a user inside the vehicle, the terminal apparatus being separate from the camera mounted in the vehicle and configured to communicate with the vehicle via a network.

11. The non-transitory computer readable medium of claim 10, wherein the travel data includes speed data on the vehicle.

12. The non-transitory computer readable medium of claim 10, wherein the travel data includes data on a route traveled by the vehicle.

13. The non-transitory computer readable medium of claim 10, wherein the information requesting capturing of the one of the images includes the predetermined condition associated with the one of the images.

14. The non-transitory computer readable medium of claim 10, wherein the program is configured to cause the computer to perform the operations further comprising transmitting, upon storing the image captured by the vehicle, an incentive to the terminal apparatus of the user inside the vehicle that captured the image that is stored.

15. The non-transitory computer readable medium of claim 10, wherein in response to a destination being set on a navigation apparatus mounted in the vehicle, the information on the first route is received from the navigation apparatus, the information on the first route being related to the set destination and a current position of the vehicle.

16. An information processing method in an information processing apparatus, the information processing method comprising:
acquiring an image captured by a camera mounted in a vehicle;
acquiring travel data on the vehicle when the image is captured; and
storing the image in a case in which the travel data satisfies a predetermined condition
wherein
the information processing further comprises: storing a list of images that need to be collected, each image being associated with the predetermined condition,
the list of images that need to be collected is a list of images to be published by a local government to introduce a tourist attraction, and
the information processing method further comprises:
acquiring information on a first route to be traveled by the vehicle, and
in response to determining the first route passing a second route that is different from the first route and enables capturing of one of the images included in the list of images, transmitting information requesting capturing of the one of the images to a terminal apparatus of a user inside the vehicle, the terminal apparatus being separate from the camera mounted in the vehicle and configured to communicate with the vehicle via a network.

17. The information processing method of claim 16, wherein the travel data includes speed data on the vehicle.

18. The information processing method of claim 16, wherein the travel data includes data on a route traveled by the vehicle.

19. The information processing method of claim 15, wherein the information requesting capturing of the one of the images includes the predetermined condition associated with the one of the images.

20. The information processing method of claim 16, wherein in response to a destination being set on a navigation apparatus mounted in the vehicle, the information on the first route is received from the navigation apparatus, the information on the first route being related to the set destination and a current position of the vehicle.

* * * * *